Figure 1:
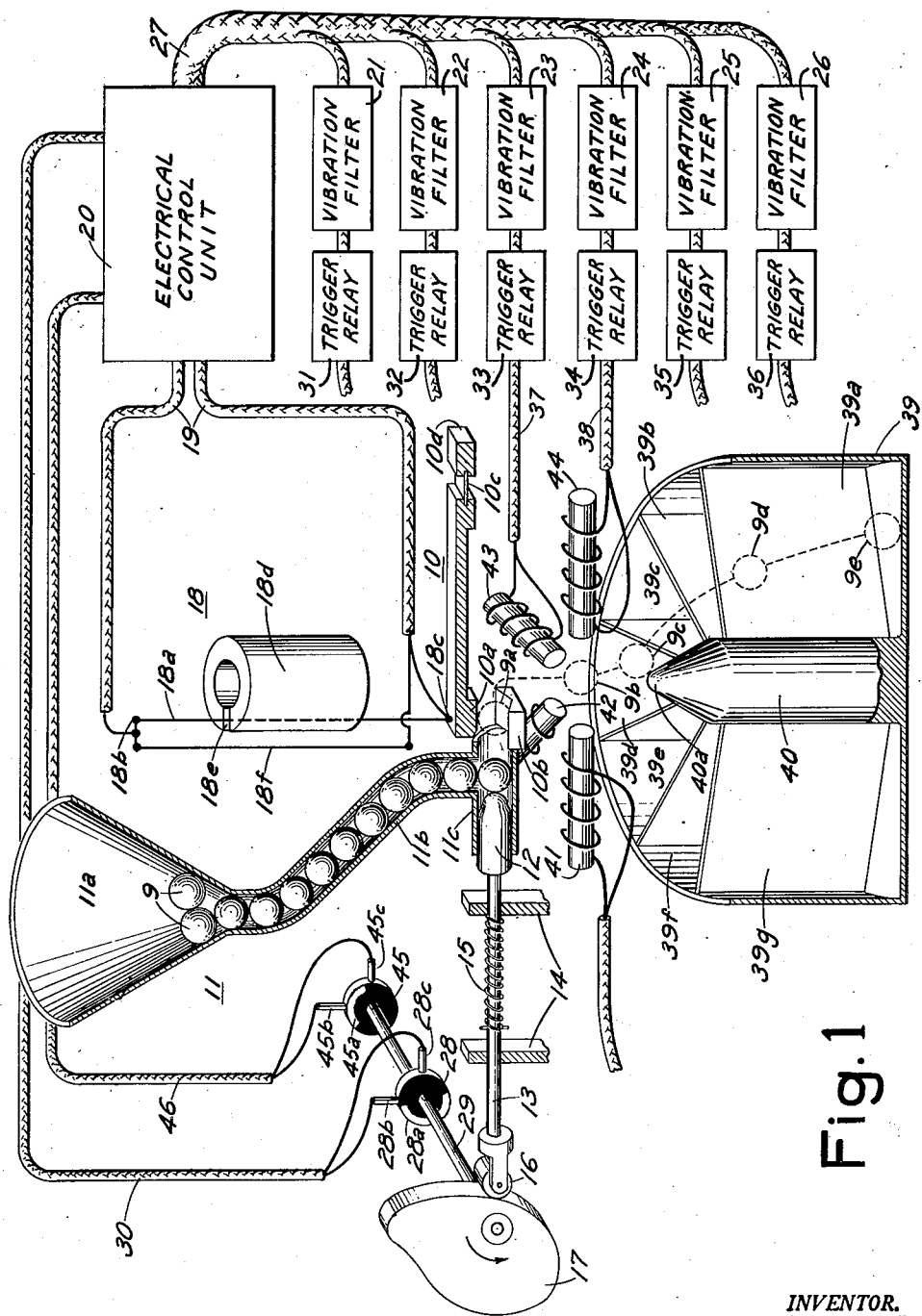

Oct. 9, 1951   F. RIEBER   2,570,485
ELECTRICAL SORTING SYSTEM
Filed June 24, 1946   3 Sheets-Sheet 1

INVENTOR.
FRANK RIEBER
BY Laurence B. Dodds

Oct. 9, 1951     F. RIEBER     2,570,485

ELECTRICAL SORTING SYSTEM

Filed June 24, 1946     3 Sheets-Sheet 2

*INVENTOR.*
*FRANK RIEBER*
BY

Patented Oct. 9, 1951

2,570,485

UNITED STATES PATENT OFFICE 2,570,485

ELECTRICAL SORTING SYSTEM

Frank Rieber, New York, N. Y., assignor to Interval Instruments, Inc., New York, N. Y., a corporation of New York Application June 24, 1946, Serial No. 678,715

11 Claims. (Cl. 209—88)

This invention relates to electrical systems for statistically sorting a plurality of similar objects differing in a predetermined characteristic within given limits and, while it is of general application, it is particularly adapted for use as a gauge by which a succession of mechanical objects may be tested with respect to a critical dimension and sorted into sub-groups within which the dimensions will not vary beyond certain preset limits. A typical use of this invention is in the sorting of balls for ball bearings and it will be specifically described in such an application.

The grinding of balls for bearings, although it is a highly efficient mechanical process, does not produce balls all of which are closely similar in dimensions. When ball bearings are assembled, using balls which vary in dimensions by as little as 100 micro-inches, certain disadvantages result. For one thing, the larger balls, receiving the heavier load, are likely to be damaged, especially when the total load on bearing reaches the maximum tolerance limit for the design in question. This results either in a lowering of the total tolerance limit specified for the bearing or in the failure of a certain number of bearings in any lot to stand up properly under the maximum specified load.

Further than this, bearings in which the sizes of the balls are not closely identical do not run as smoothly as perfectly matched ball groupings. This lack of smoothness and dependability is a serious handicap, particularly in critical operations such as the ball bearings supporting rapidly moving or delicate parts, or both, such as the gyroscopic rotors used in flight control apparatus.

A further disadvantage of such relatively wide range of ball dimensions lies in the fact that not all balls are precise spheres. There is a tendency for some balls to develop triangular pyramidal deformations which are not detected by usual devices for determining tolerances and these deformations are particularly intolerable in a bearing.

Therefore, mechanical gauging or sorting of balls for ball bearings is a highly essential step if the bearings are to carry their maximum load and operate smoothly. At an early date, sorting methods used for this purpose consisted effectively in passing the balls through gauging slots of varying predetermined dimensions. This method resulted in grouping of the balls such that, for a ball diameter of approximately $\frac{1}{16}$ inch, for example, the largest and the smallest ball in each group did not vary in diameter by more than 100 micro-inches. However, it has been found that bearings made with balls varying within limits of 100 micro-inches do not meet the exacting requirements of many applications. Accordingly, attempts have been made to subject a group of balls, roughly sorted to agree within 100 micro-inches, into sub-groups, agreement within each group being as close as 10 micro-inches.

The method by which this gauging and sorting of balls into sub-groups has been previously accomplished involves much time spent by a skilled operator with highly precise hand-operated precision tools. In spite of this high time cost, however, it has been found that the highly improved grade of ball bearing resulting from such sorting has an economical advantage in many applications, and has made possible speeds and accuracies without which a wide variety of useful devices would have been unattainable.

Later efforts directed at this problem of sorting to closer tolerances have resulted in automatic gauging apparatus by which a series of such balls are automatically fed in succession through a sensitive gauging apparatus, the response of this gauge being caused to operate a subsequent sorting mechanism by which the balls passing through the gauge are selectively delivered to one or more containers designated for the appropriate sub-dimensional groups. Such gauging apparatus has generally consisted essentially of gauging faces or anvils brought into contact with each ball, these gauging faces operating, in turn, amplifying apparatus by which small differences in ball dimensions result in much larger differences in some quantity used to control or indicate the group in which the gauged ball fell. Generally, a change in the dimensions between the gauge anvils has been used to create a change in the amplitude of an electrical signal which, after further amplification, varies in amplitude not only with the changes in gauge dimensions, which it is desired to measure, but also with changes in the amplification factor of the amplifier due to any of several causes, which constitute highly undesirable errors in the operation.

The problems discussed above with respect to bearing balls are applicable also to ball races which can be similarly statistically separated into groups within narrow gauging limits and subsequently assembled with balls of a corresponding dimensional group.

It is an object of the present invention, therefore, to provide a new and improved electrical system for statistically sorting a plurality of similar objects, such as bearing balls or ball races, differing in a predetermined characteristic within given limits, whch avoids one or more of the above-mentoned disadvantages of the prior art sorting systems of the type described.

It is another object of the invention to provide a new and improved electrical sorting system of the type described which, in operation, is substantially independent of variations in the operating characteristics of any of its components, such as vacuum-tube amplifiers.

It is a further object of the invention to provide a new and improved electrical sorting system of the type described which is capable of sorting objects into groups of much narrower gauging limits than has heretofore been possible.

In accordance with the invention, there is provided an electrical system for statistically sorting a plurality of similar objects differing in a predetermined characteristic within given limits which comprises a gauge including an element movable in response to the physical dimension of an object to be gauged, means for feeding objects in succession to the gauge and ejecting them therefrom, and means for developing a periodic signal including an element responsive to movement of the gauging element for varying the frequency of the developed signal. The system also includes a fixed-tuned filter circuit energized by the developed signal and effective to pass the signal within a limited frequency range, and actuating means controlled by the signal passed by the filter circuit for determining the course of an object ejected from the gauge.

Figure 1A:
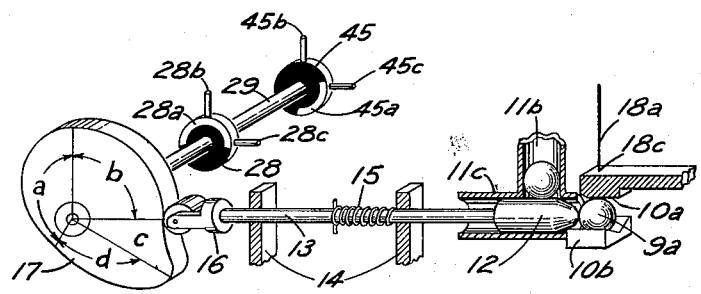
Figure 1B:
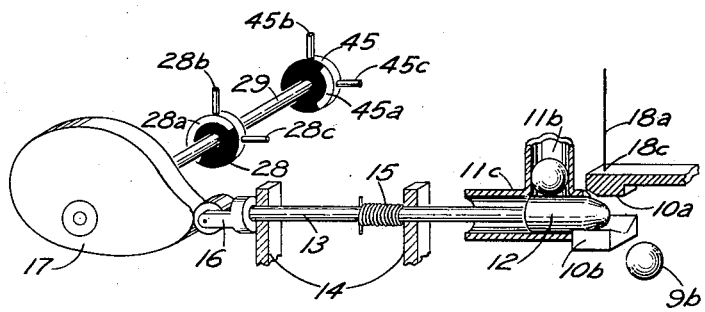
Figure 2:
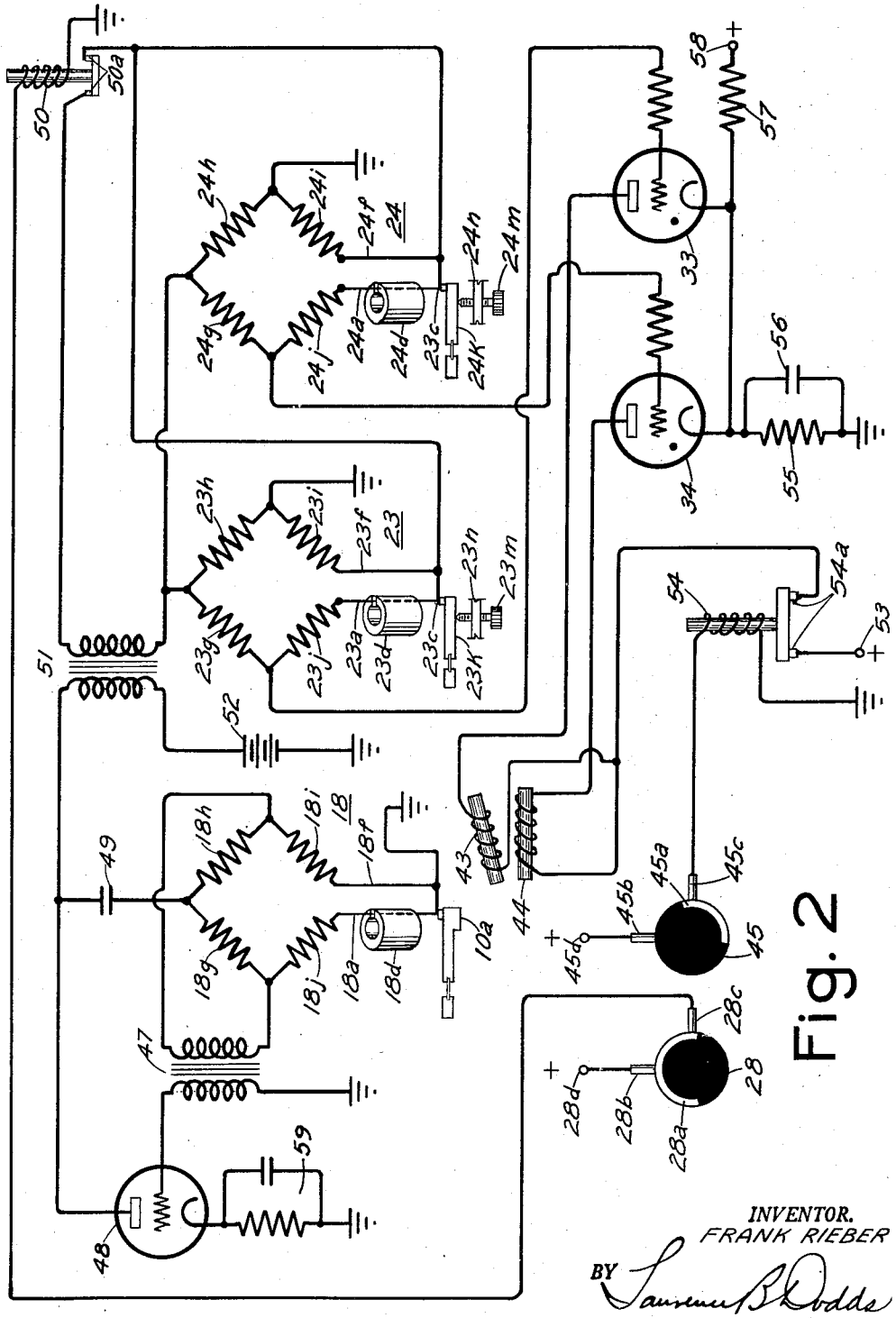

Referring now to the drawings, Fig. 1 is a perspective view, partially schematic, of a complete electrical sorting system embodying the invention with certain of the duplicate elements omitted for the sake of clarity; Figs. 1a and 1b are fragmentary views of the feeding mechanism of the system of Fig. 1 in successive positions in its cycle of operation; while Fig. 2 is an electrical circuit diagram of the system of Fig. 1 with certain of the duplicate elements also omitted for the sake of clarity.

Referring more particularly to Fig. 1 of the drawings, there is represented an electrical system embodying the invention for statistically sorting a plurality of similar magnetic objects differing in a predetermined characteristic within given limits, specifically for sorting a group of bearing balls 9 in accordance with their physical dimensions. This system includes means responsive to such characteristic, that is, the dimension, of the objects to be sorted. Specifically, this responsive means comprises a gauging means 10 having opposed upper and lower gauging jaws 10a and 10b, respectively, responsive to the diameter of the bearing balls as they are passed therethrough. The lower gauging jaw 10b is designed to be fixed, while the upper gauging jaw 10a is pivotally supported by a hinge spring 10c from a supporting block 10d.

The sorting system of the invention also includes means for feeding the bearing balls in succession to the gauging means 10 and ejecting them therefrom with a dwell between the jaws 10a, 10b. This feeding means 11 may be of any conventional type, but there is illustrated by way of example a hopper 11a into which the balls to be sorted are placed, terminating in a neck or funnel 11b dimensioned to constrict the balls to a single column. The neck 11b feeds into a short conduit 11c disposed in registry with the opening between the jaws 10a, 10b of the gauging means 10. Operating in the conduit 11c is a plunger 12 supported on a rod 13 mounted in standards 14, 14 and biased by a spring 15 to a withdrawn position. The rod 13 terminates in a cam roller or follower 16 bearing on a rotatable cam 17 having a configuration such as to reciprocate the plunger 12 in a predetermined cyclical movement, as described hereinafter. It will be understood that the cam 17 may be rotated by any suitable motor means, not shown.

The sorting system of the invention also includes means controlled by the gauging means 10, while a ball is held in the jaws thereof, for developing a periodic signal having a freqeuncy varying with the response of the gauging means, that is, with the dimension of the ball as determined by the gauging jaws 10a, 10b. The periodic signal-generating means may be of any conventional type, but is preferably in the form of a tunable vibration oscillator 18 of the type described and claimed in applicant's copending application Serial No. 657,880, filed March 28, 1946, entitled "Frequency Determining Unit." By the term "vibration oscillator" as used herein and in the appended claims is meant an oscillation generator in which the frequency-determining element is a mechanically vibrating device, such as a tensioned strand. The oscillator 18 comprises a tensioned conductive strand or wire 18a rigidly supported at point 18b and rigidly attached at point 18c to the gauging jaw 10a. The wire 18a is mounted in a uniform magnetic field transverse to the wire, which may be developed by a cylindrical permanent magnet 18d having a longitudinal slot 18e in which the wire 18a is disposed. The oscillator 18 also includes an untensioned wire 18f outside of the field of the magnet 18d, the wires 18a and 18f being connected to suitable input and output circuits, as described hereinafter in connection with the electrical circuit of the system shown in Fig. 2. As illustrated, the connections to the wires 18a, 18f may be made by way of cables 19 to an electrical control unit 20 including various circuit connections and control elements described hereinafter in connection with Fig. 2.

The electrical sorting system of the invention further includes frequency-selective means energized by the signal developed by the oscillation generator 18. This frequency-selective means may be in the form of a plurality of vibration filters 21–26, inclusive, connected to the control unit 20 by cabling 27. By the term "vibration filter" as used herein and in the appended claims is meant a filter which depends for its frequency-selective properties on a mechanically vibrating element, such as a tensioned strand. Each of the vibration filters may be of a construction similar to that of the oscillation generator 18 described in more detail in applicant's aforesaid copending application. The filters 21–26, inclusive, are stagger-tuned, that is, tuned to closely adjacent frequencies, and preferably have overlapping response characteristics.

The system also preferably includes means acting in synchronism with the feeding means 11 for energizing the filters with the signal developed by the generator 18 simultaneously with, or shortly before, a ball to be gauged reaches its final position between the gauging jaws 10a, 10b, the energization being maintained while the object dwells between such jaws. This synchronising means may be in the form of a commutator disc 28 mounted on a shaft 29 common to the cam 17. The disc 28 is of insulation material and is provided with a conductive segment 28a and a pair of electrical contacts or brushes 28b, 28c connected by way of a cable 30 to the electrical control unit 20.

The sorting system of the invention further includes actuating means controlled by the frequency-selective means or filters 21-26, inclusive, for determining the course of a ball or other object ejected from the gauging means 10. This actuating means is preferably in the form of a plurality of electro-mechanical actuating devices individually controlled by the filters 21-26, inclusive. Specifically, there are provided a plurality of trigger relays 31-36, inclusive, coupled to and individually controlled by filters 21-26, inclusive, and a plurality of actuating elements, such as electromagnets, individually connected to and controlled by the trigger relays 31-36, inclusive. By the term "trigger relay" as used herein and in the appended claims is meant a discontinuous control device which may be triggered or rendered operative by the application of a control impulse but is thereupon insensitive to further control effects until completely de-energized. For the sake of simplicity only four of the electromagnets 41, 42, 43, and 44 are shown and only the latter two are shown as connected to their respective trigger relays 33 and 34 by cables 37 and 38, respectively. As illustrated, the electromagnets 41-44, inclusive, and the two additional electromagnets not shown are arranged in a circular array about the trajectory of a ball ejected from the jaws 10a, 10b of the responsive means, such trajectory being indicated by the dotted line connecting the dotted balls 9a, 9b, 9c, 9d, and 9e, representing the positions of a ball at the ends of successive short time intervals.

There is provided collecting means for the balls which may be in the form of a cylindrical receptacle 39 having twelve radial compartments, only seven compartments 39a-39g, inclusive, being shown for the sake of clarity. The inner walls of the compartments terminate in a cylindrical post 40 having a tapered or conical upper end 40a to facilitate deflecting of the balls into the proper compartments.

The sorting system of the invention includes further means acting in synchronism with the feeding means 11 for de-energizing all of the trigger relays a predetermined interval after each ball or object has been ejected from the gauging means 10. This synchronizing means may be in the form of a second commutator 45 also mounted on the shaft 29 and comprising a disc of insulation material having a conductive segment 45a and a pair of co-operating brushes 45b and 45c connected by way of a cable 46 to the electrical control unit 20.

The details of the electrical circuit of the sorting system of the invention will best be understood by reference to Fig. 2, in which elements corresponding to those of Fig. 1 are identified by the same reference numerals. As indicated in this figure, the means acting in synchronism with the feeding means 11 for controlling the energization of the several vibration filters 21-26, inclusive, includes the commutator 28 and a relay 50 having normally open contacts 50a.

As shown in Fig. 2, the wires 18a and 18f of the oscillation generator 18 are included in two adjacent arms of a Wheatstone bridge network comprising resistors 18g, 18h, 18i, and 18j. One diagonal of the bridge network is connected through a transformer 47 to the grid of a vacuum tube 48, the anode circuit of which is connected across the other diagonal of the bridge network through a coupling condenser 49 and a cathode-biasing circuit 59. The anode-cathode circuit of tube 48 is completed through the primary winding of an output transformer 51 and a suitable source, such as a battery 52. The secondary winding of transformer 51 is connected to supply the several vibration filters 21-26, inclusive, through contacts 50a of relay 50, the winding of which is energized through the brushes 28b, 28c of commutator 28 from any suitable source, such as a supply circuit terminal 28d.

The wires of the vibration filters 23 and 24 are similarly connected in Wheatstone bridge networks, the corresponding elements of which are identified by the same subscripts as those of the vibration generator 18. However, the tensioned wires of the vibration filters are connected to manually adjustable elements for adjusting their tension; for example, the wire 23a is connected to a pivoted arm 23k which is adjusted by means of a thumb screw 23m mounted in a support 23n. As indicated, the several vibration filter networks 23, 24, etc., are energized in parallel across one diagonal thereof, from the transformer 51 through the contacts 50a of relay 50.

The sorting system further includes means responsive to the operation of any trigger relay for preventing subsequent operation of any other relay. Specifically, the trigger relays may be in the form of vapor electric-discharge tubes or relays, such as the tubes 33, 34, each having anode and cathode and control electrodes and commercially available under the name "Thyratron." The actuating electromagnets, such as the elements 43 and 44, are individually connected in the anode-cathode circuits of the relays 33, 34, respectively, which are energized in parallel from a suitable source, such as a supply circuit terminal 53, through normally closed contacts 54a of a relay 54. The winding of relay 54 is energized from a suitable source, such as a supply terminal 45d, through brushes 45b and 45c of commutator 45. The several trigger relays 33, 34, etc., are provided with a common cathode resistor 55 having a parallel by-pass condenser 56. The resistor 55 is connected in series with a resistor 57 to form a voltage divider across a suitable source, such as a supply circuit terminal 58. The resistor 55 is effective to preclude operation of any trigger relay subsequent to the operation of the initial trigger relay, as described hereinafter.

Considering now the operation of the sorting system of the invention, it will be assumed that the several components and elements are in the respective positions illustrated in Fig. 1 of the drawings. It will be seen, therefore, that the cam 17 has just permitted withdrawal of the plunger 12 by biasing spring 15 to let a ball 9 drop from the funnel 11b into the conduit 11c. As the cam 17 is rotated, the ball 9 is advanced and located between the gauging jaws 10a, 10b, as shown in Fig. 1a. Under this condition, oscillation generator 18 operates continuously in a manner described in more detail in applicant's aforesaid copending application. In brief, periodic current passing through the wire 18a thereof in the field of magnet 18d causes it to vibrate, upsetting the dynamic impedance of the bridge network. The unbalance voltage of this bridge network is supplied through the transformer 47 to the grid of vacuum tube 48, the anode circuit of which supplies the other diagonal of the bridge network through the coupling condenser

49. Due to this regenerative connection through the vacuum tube 48, sustained oscillations are developed at a frequency dependent upon the elongation or tension of the wire 18a. With the ball 9a in the gauging jaws, as illustrated, the elongation of the wire 18a is determined by the physical dimensions of the ball. Thus, the frequency of the oscillations developed by the unit 18 is dependent upon the dimensions of the ball being gauged.

Under the conditions assumed, the relay 50 is energized through the brushes of the commutator 28 to close its contacts 50a to energize the vibration filters 21–26, inclusive. As indicated by the extent of the segment 28a, this circuit has actually been completed upon the insertion of the ball 9a in the gauging jaws to permit the related vibration filter to build up to its equilibrium vibrating condition. As explained in more detail in aforesaid copending application, the vibration filters 21–26, inclusive, are sharply selective to energization at their natural frequencies, that is, their response drops off rapidly for excitation frequencies on either side of the natural frequency for which they are adjusted.

Assume, for example, that for the particular ball 9a, the frequency generated by the oscillator 18 corresponds almost exactly to the natural frequency of the vibration filter 24. Under this condition it will vibrate strongly, while the other vibration filters are vibrating relatively weakly. The strong vibration of the unit 24 upsets the dynamic balance of its associated bridge network, the unbalance output of which is connected to the grid of the vapor electric or trigger relay 34. The cathode of each of the trigger relays 33, 34, etc., is initially biased slightly positive by the voltage divider 55, 57 so that it is maintained nonconductive. However, the relay 34 responds to the unbalance voltage of unit 24 to energize the electromagnet 44. This energization of electromagnet 44 is effective to deflect the ball 9a, upon its ejection from the jaws 10a, 10b by continued rotation of cam 17, as shown in Fig. 1b, into the position represented by the ball 9b. The ball thus falls on the right-hand surface of the conical end 40a of post 40 which thereupon deflects the ball through successive positions 9c, 9d, and 9e into chamber 39a of receptacle 39. That is, each ball ejected from the feeding means 11 is selectively deflected from its normal trajectory in a direction dependent upon its dimension as determined by the gauging means 10. As soon as the relay 34 is energized, as described, the flow of space current through the common cathode load resistor 55 is such as to bias the cathodes of the remaining trigger relays substantially positive and is thus effective to prevent subsequent operation of any other relay.

Referring particularly to Fig. 1a, the cam 17 is given such a configuration as to provide a rapid forward feed of the successive balls to the gauging jaws 10a, 10b, represented by the portion *a* of cam 17; a short dwell of each ball between the gauging jaws, represented by portion *b* of cam 17, where gauging takes place as described above; a short rapid ejection stroke, represented by portion *c* of cam 17; and a rapid return stroke under the influence of the biasing spring 15, represented by portion *d* of cam 17. During the time of the return stroke, which permits a ball 9a to fall into position 9b, the commutator 45 closes the circuit through its brushes 45b and 45c to energize the relay 54 which opens its contacts 54a to interrupt the circuit through all the electromagnets and associated trigger relays 31–36, inclusive, to restore them to a responsive condition for control by the unbalance of the responsive vibration filter in response to the gauging of a successive ball. It will be noted that approximately simultaneously with the interruption of the circuits of the trigger relays, the commutator 28 is effective to open the circuit of relay 50 which, in turn, opens its contacts to de-energize the several vibration filters 21–26, inclusive.

In the design of the sorting system described, the starting point is the gauging limits of the balls that are to be sorted. Assume, for example, that these gauging limits include a range of 100 micro-inches and that it is desired to sort the balls into twelve groups, each comprising a gauging limit of approximately 8 micro-inches. The oscillation generator 18 is, therefore, designed to generate a frequency adjustable over a given range sufficient to provide feasible selective response of the several vibration filters for movement of the gauging jaws 10a, 10b over the total range of 100 micro-inches. The vibration filters 21–26, inclusive, are then adjusted by their respective thumb screws, such as the thumb screws 23m, 24m, to equally spaced frequencies over the normal frequency range of the oscillation generator 18. Under such conditions, if the generated frequency corresponds approximately to the frequency of maximum response of any of the vibration filters, it will actuate its associated trigger relay to energize the associated electromagnet to deflect the ball, when ejected from the gauging jaws 10a, 10b, in any of six equally angularly spaced directions from its normal trajectory. If under such conditions the receptacle 39 were provided with six compartments, the balls would be sorted directly into six groups each having dimensions varying not more than approximately 16 micro-inches. However, by designing the vibration filters 21–26, inclusive, with proper values of Q and staggering their natural frequencies, their response characteristics may be made to overlap with the intersection of adjacent response characteristics being at approximately 0.7 times the maximum response of the filters. After a ball is transmitted through the gauging jaws of dimensions such that the frequency generated by the unit 18 falls half way between the natural frequencies of adjacent filters, these two filters develop equal responses and are effective to trigger both of their associated relays. That is, two adjacent electromagnets are energized simultaneously and the ball is deflected from its trajectory in a direction bisecting the angle between the two electromagnets. Under such conditions, it is readily apparent that the balls may be sorted into twelve categories each having dimensions varying within the limits of approximately 8 micro-inches by the use of only six electromagnets and associated energizing circuits.

While it will be apparent that the design constants of the sorting system of the invention will vary widely in accordance with the particular performance specifications, there follow, by way of example, certain design constants suitable for use in a system for sorting balls having the gauging limits described into the groupings described. The vibrating wire of each of the vibration filters and vibration oscillators may be a single-crystal drawn tungsten wire 1 inch in length and 0.0007 inch in diameter. An initial tension is assumed at approximately 35 grams which is applied by attaching the wire to the gauging jaw 10a or to one of the pivotal supports 23k, 24k, etc. Preferably the connection is made to the wire 18a so that gauging motion is transmitted directly to the vibrating wire without the interposition of any lever ratio. At this tension, the wire vibrates in its fundamental mode at a frequency of 5400 cycles per second. By adjusting the length of the wire over a range of 100 micro-inches, the frequency of the wire varies approximately 0.69 cycles per micro-inch or, inversely, one cycle for each 1.45 micro-inch adjustment. The vibration oscillator and vibration filters may be designed to have a Q of approximately 450 by minimizing electrical, mechanical, and acoustic radiation, as described in the aforesaid copending application. Such a value of Q imparts a response band width to each of the filters 21–26, inclusive, of approximately 12 cycles at 0.7 maximum response and will consequently determine a dimension range of approximately 17 micro-inches, as desired.

The rate at which objects may be sorted by the system of the invention is not limited by the timing characteristics of the electrical system, but solely by the timing characteristics of the reciprocating plunger 12 and the trajectory time of the balls ejected from the gauging jaws. This is because the time of response of the vibration oscillator 18 and of the vibration filters of the invention is so short, representing a relatively few oscillation cycles, that it does not act as a limiting factor on the rate at which the balls can be sorted. Compensation for extraneous factors, such as variations in temperature, may be effected by any of the arrangements in the aforesaid copending application, or the system may be operated under uniform conditions for which it is initially adjusted.

The electrical sorting system of the invention has the advantage over prior sorting systems in that the translation of dimensional variations to frequency variations and the reverse translation of frequency variations to an indication or mechanical displacement provide a higher degree of stability and accuracy than heretofore obtainable.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electrical system for statistically sorting a plurality of similar magnetic objects differing in a predetermined characteristic within given limits comprising, means responsive to said characteristic of an object, means for feeding objects in succession to said responsive means and ejecting them therefrom, means controlled by said responsive means for developing a periodic signal having a frequency varying with the response thereof, a plurality of fixed-tuned filters energized solely by said signal, and a plurality of electromagnets individually controlled by said filters, said electromagnets being arranged in a circular array about the trajectory of an object ejected from said responsive means for selectively deflecting each object from its normal trajectory in a direction dependent upon said predetermined characteristic thereof.

2. An electrical system for statistically sorting a plurality of similar objects differing in a predetermined physical dimension within given limits comprising: a gauge including an element movable in response to the physical dimension of an object to be gauged; means for feeding objects in succession to said gauge and ejecting them therefrom; means for developing a periodic signal including an element responsive to movement of said gauging element for varying the frequency of the developed signal; a fixed-tuned filter circuit energized by said developed signal and effective to pass said signal within a limited frequency range; and actuating means controlled by the signal passed by said filter circuit for determining the course of an object ejected from said gauge.

3. An electrical system for statistically sorting a plurality of similar objects differing in a predetermined physical dimension within given limits comprising: a gauge including opposed gauging jaws one of which is movable in response to the physical dimension of an object to be gauged; means for feeding objects in succession to said gauge and ejecting them therefrom; means for developing a periodic signal including an element responsive to movement of said gauging element for maintaining the frequency of the developed signal constant while an object is held in said gauging jaws and of a value varying with the movement of said movable jaw; a fixed-tuned filter circuit energized by said developed signal and effective to pass said signal within a limited frequency range; and actuating means controlled by the signal passed by said filter circuit for determining the course of an object ejected from said gauge.

4. An electrical system for statistically sorting a plurality of similar objects differing in a predetermined physical dimension within given limits comprising: a gauge including an element movable in response to the physical dimension of an object to be gauged; means for feeding objects in succession to said gauge and ejecting them therefrom; a tunable vibration oscillator for developing a periodic signal including an element responsive to movement of said gauging element for varying the frequency of the developed signal; a fixed-tuned filter circuit energized by said developed signal and effective to pass said signal within a limited frequency range; and actuating means controlled by the signal passed by said filter circuit for determining the course of an object ejected from said gauge.

5. An electrical system for statistically sorting a plurality of similar objects differing in a predetermined physical dimension within given limits comprising: a gauge including an element movable in response to the physical dimension of an object to be gauged; means for feeding objects in succession to said gauge and ejecting them therefrom; means for developing a periodic signal including an element responsive to movement of said gauging element for varying the frequency of the developed signal; a plurality of fixed-stagger-tuned vibration filters having overlapping characteristics energized by said developed signal, each effective to pass said signal within a limited frequency range; and actuating means controlled by the signals passed by said filters for determining the course of an object ejected from said gauge.

6. An electrical system for statistically sorting a plurality of similar objects differing in a predetermined physical dimension within given limits comprising: a gauge including an element movable in response to the physical dimension of an object to be gauged; means for feeding objects in succession to said gauge and ejecting them therefrom; means for developing a periodic signal including an element responsive to movement of said gauging element for varying the frequency of the developed signal; a plurality of fixed-tuned filter circuits energized by said developed signal, each effective to pass said signal within a limited frequency range; and a plurality of electro-mechanical actuating devices individually controlled by the signals passed by said filter circuits for determining the course of an object ejected from said gauge.

7. An electrical system for statistically sorting a plurality of similar objects differing in a predetermined physical dimension within given limits comprising: a gauge including an element movable in response to the physical dimension of an object to be gauged; means for feeding objects in succession to said gauge and ejecting them therefrom; means for developing a periodic signal including an element responsive to movement of said gauging element for varying the frequency of the developed signal; a plurality of fixed-tuned filter circuits energized by said developed signal, each effective to pass said signal within a limited frequency range; a plurality of trigger relays individually controlled by the signals passed by said filter circuits; and a plurality of actuating means individually controlled by said relays for determining the course of an object ejected from said gauge.

8. An electrical system for statistically sorting a plurality of similar objects differing in a predetermined physical dimension within given limits comprising; a gauge including an element movable in response to the physical dimension of an object to be gauged; means for feeding objects in succession to said gauge and ejecting them therefrom; means for developing a periodic signal including an element responsive to movement of said gauging element for varying the frequency of the developed signal; a plurality of fixed-tuned filter circuits energized by said developed signal, each effective to pass said signal within a limited frequency range; a plurality of trigger relays individually controlled by the signals passed by said filter circuits; a plurality of actuating means individually controlled by said relays for determining the course of an object ejected from said gauge; and means acting in synchronism with said feeding means for deenergizing all of said trigger relays a predetermined interval after each object has been ejected from said gauge.

9. An electrical system for statistically sorting a plurality of similar objects differing in a predetermined physical dimension within given limits comprising: a gauge including an element movable in response to the physical dimension of an object to be gauged; means for feeding objects in succession to said gauge and ejecting them therefrom; means for developing a periodic signal including an element responsive to movement of said gauging element for varying the frequency of the developed signal; a plurality of fixed-tuned filter circuits energized by said developed signal, each effective to pass said signal within a limited frequency range; a plurality of trigger relays individually controlled by the signals passed by said filter circuits; a plurality of actuating means individually controlled by said relays for determining the course of an object ejected from said gauge; and means responsive to the operation of any trigger relay for preventing subsequent operation of any other relay.

10. An electrical system for statistically sorting a plurality of similar objects differing in a predetermined physical dimension within given limits comprising; a gauge including an element movable in response to the physical dimension of an object to be gauged; means for feeding objects in succession to said gauge and ejecting them therefrom; means for developing a periodic signal including an element responsive to movement of said gauging element for varying the frequency of the developed signal; a plurality of fixed-tuned filter circuits energized by said developed signal, each effective to pass said signal within a limited frequency range; a plurality of vapor-electric discharge relays each having anode and cathode electrodes and individually controlled by said filter circuits; a plurality of actuating devices individually connected in the anode-cathode circuits of said relays for determining the course of an object ejected from said gauge; and a resistor common to the anode-cathode and grid-cathode circuits of said relays effective upon the operation of any relay to prevent subsequent operation of any other relay.

11. An electrical system for statistically sorting a plurality of similar objects differing in a predetermined physical dimension within given limits comprising: a gauge including jaws relatively movable in response to the physical dimension of an object to be gauged; means for feeding objects in succession to said gauge and ejecting them therefrom with a dwell in said jaws; means for developing a periodic signal including an element responsive to movement of said gauging element for varying the frequency of the developed signal; a plurality of fixed-tuned filter circuits; means acting in synchronism with said feeding means for energizing said filter circuits with said developed signal while each object dwells within said jaws; and actuating means controlled by the signals passed by said filter circuits for determining the course of an object ejected from said gauge.

FRANK RIEBER.

REFERENCES CITED

The following references are of record in the file of this patent:

UNITED STATES PATENTS

| Number | Name | Date |
|---|---|---|
| 2,148,578 | Pullis | Feb. 28, 1939 |
| 2,265,011 | Siegel | Dec. 2, 1941 |
| 2,312,357 | Odquist | Mar. 2, 1943 |
| 2,357,512 | Gaiser | Sept. 5, 1944 |
| 2,381,990 | Stevens | Aug. 14, 1945 |
| 2,382,885 | Landay | Aug. 14, 1945 |
| 2,421,933 | Goldstine | June 10, 1947 |

OTHER REFERENCES

Publication by C. W. Loeber, "Electronics," May 1930, pages 70, 71. (Copy found in Scientific Library.)